United States Patent [19]

Meyer

[11] Patent Number: 5,293,857
[45] Date of Patent: Mar. 15, 1994

[54] HYDROGEN GAS FUEL AND MANAGEMENT SYSTEM FOR AN INTERNAL COMBUSTION ENGINE UTILIZING HYDROGEN GAS FUEL

[76] Inventor: Stanley Meyer, 3792 Broadway, Grove City, Ohio 43123

[21] Appl. No.: 863,281

[22] PCT Filed: Nov. 2, 1990

[86] PCT No.: PCT/US90/06513
§ 371 Date: Jun. 24, 1992
§ 102(e) Date: Jun. 24, 1992

[51] Int. Cl.⁵ .............. F02M 25/07; F02M 21/02; F02M 27/00
[52] U.S. Cl. ..................... 123/571; 123/3; 123/539; 123/DIG. 12
[58] Field of Search ............. 123/1 A, 3, 539, 567, 123/568, 571, DIG. 12; 138/111

[56] References Cited

U.S. PATENT DOCUMENTS

| | | | |
|---|---|---|---|
| 3,844,262 | 10/1974 | Dieges | 123/568 |
| 3,980,053 | 9/1976 | Horvath | 123/3 |
| 3,982,878 | 9/1976 | Yamane et al. | 431/2 |
| 4,031,865 | 6/1977 | Dufour | 123/1 A |
| 4,389,981 | 6/1983 | Meyer | 123/3 |
| 4,575,383 | 3/1986 | Lowther et al. | 123/1 R |
| 4,773,981 | 9/1988 | Bidwell | 123/3 |

Primary Examiner—Tony M. Argenbright
Attorney, Agent, or Firm—Porter, Wright, Morris & Arthur

[57] ABSTRACT

A gas fuel for an internal combustion engine comprising a mixture of gases having a proportion of hydrogen to oxygen of approximately 2:1 and a regulated density of the hydrogen component of the mixture such that the burn rate of the mixture approximates that of a fossil fuel and a system for maintaining the foregoing gas fuel mixture and characteristics in an internal combustion engine.

7 Claims, 11 Drawing Sheets

TOP VIEW

HYDROGEN GAS FUEL AND MANAGEMENT SYSTEM FOR AN INTERNAL COMBUSTION ENGINE UTILIZING HYDROGEN GAS FUEL

Hydrogen has long been regarded as an efficient, abundant and potentially non-polluting energy source. Yet despite such desirable attributes, hydrogen has not been widely, or practically, applied in applications where the use of hydrogen as a fuel is self-evidently desirable, such as in motor vehicles powered by internal combustion engines.

In part, practical use of hydrogen is inhibited by difficulties in the safe transmission of the gas. Hydrogen has an inherent high volatility and a correspondingly rapid dispersion characteristic in other gas mixtures such as the atmosphere. Further, it is difficult to control the distribution of a hydrogen gas fuel and to maintain consistent combustion characteristics for a hydrogen gas fuel, particularly in a motor vehicle internal combustion engine.

It is an object of this invention to overcome such difficulties and to provide a fuel gas management and delivery system for internal combustion engines that utilize hydrogen as a fuel. The system includes a safe and effective distribution means for supplying a hydrogen fuel to an internal combustion engine, means for fuel injection applications of hydrogen fuel in such an engine, means for controlling the burn rate of hydrogen for the efficient use of a hydrogen fuel gas, and means for overcoming prior art problems of engine shut down caused by an overenrichment of hydrogen in the fuel supply to the engine.

In particular, when hydrogen gas fuel is used in a motor vehicle internal combustion engine, an overenrichment of the hydrogen component of the fuel gas injected into the engine frequently occurs and results either in (1) an engine shut down, because of the narrow combustion window (a term defined hereinafter) for hydrogen, or (2) a significant waste of the "overenriched" portion of the fuel not combusted—the fuel is expelled in the engine exhaust. In prior art attempts, mechanical meters, valves and switches that were conventionally used in engine fuel systems for petroleum based, fossil fuels were too slow to adapt to engine conditions. Similarly, prior art system included processors that were intended to control the engine in view of predetermined operating parameters with little regard for engine effects caused by the injection of a hydrogen fuel. As a result overenrichment of hydrogen in the fuel/combustion mixture consistently remains a problem in the development of a hydrogen fueled internal combustion engine. Conventional hydrogen fueled engines are prone to shut down and do not smoothly operate over the extended range of engine speeds considered desirable and necessary in a motor vehicle.

It is accordingly an object of this invention to provide a fuel distribution system for a hydrogen fueled internal combustion engine that reduces the problem of fuel overenrichment and provides a smooth operating characteristic for engine speeds required in conventional use.

It is also an object to provide a "tuned" combustion system, adaptable not only for hydrogen, but also to other fuel stocks by which optimum combustion characteristics are maintained for the fuel over the operating range of the engine.

And it is a further object to provide an integrated operating system including fuel generation and control means for a hydrogen fueled internal combustion engine.

These and other objects of the invention will become evident to those of skill in the art when the following description of the preferred embodiment is considered in conjunction with the drawings in which:

FIG. 1 shows the combustion envelope of hydrogen compared to the combustion envelope of gasoline and illustrates a goal achieved by the invention in maintaining an optimum and uniform combustion rate for hydrogen throughout the effective range of engine RPM. As used herein, the "combustion envelope" refers to the range within which combustion of a fuel gas is possible, given a predetermined quantity of combustible fuel and its ratio to the combustion media, i.e. oxygen.)

Figure 6:
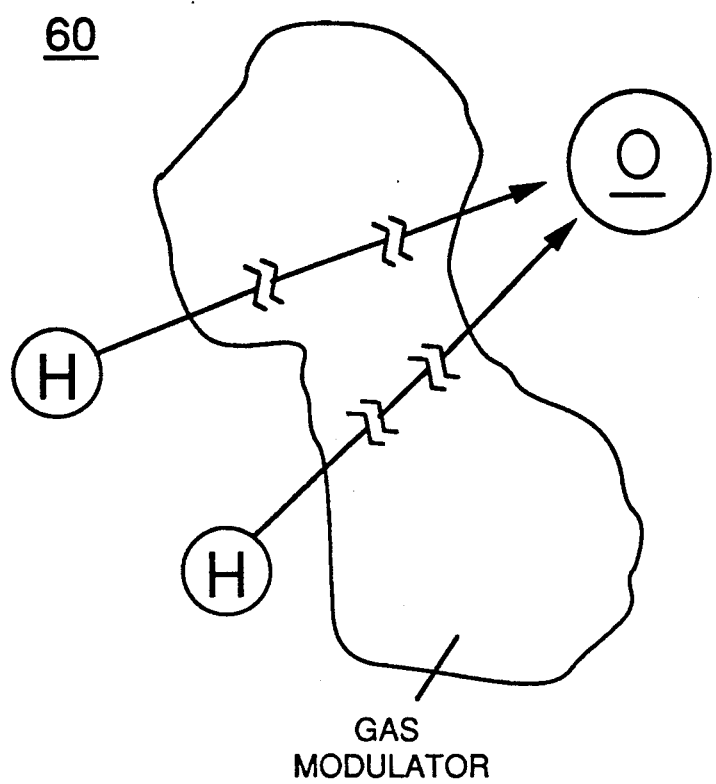

FIG. 6 figuratively represents the modulating effect upon hydrogen gas characteristics of other non-combustible gases included in a fuel gas mixture containing hydrogen in accord with the invention and its fuel gas management system.

Figure 7:
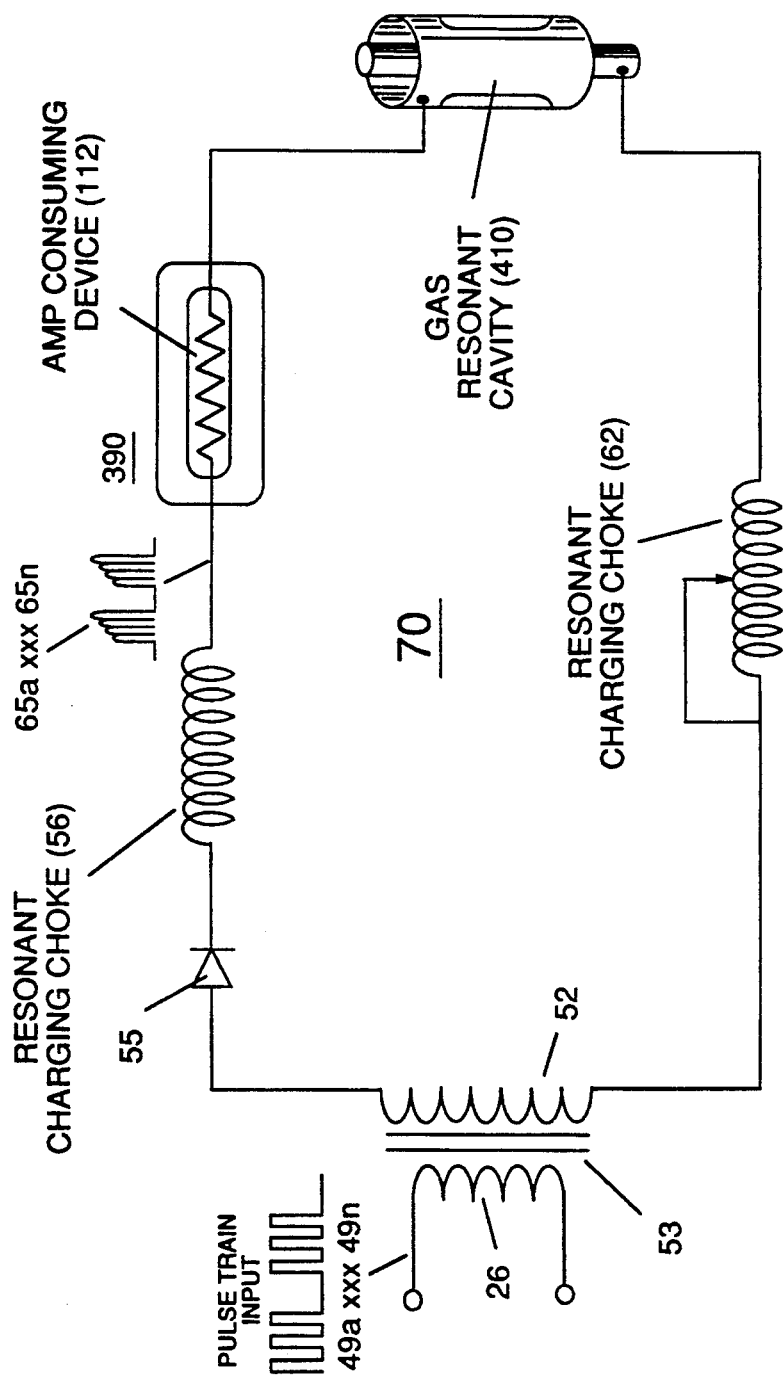

FIG. 7 shows the electron extractor circuit used in the air processor section to ionize and maintain the ionization of introduced air gas.

In my prior United States Letters Patents, I have, inter alia, described means for the production of a fuel gas mixture having a hydrogen component, U.S. Pat. No. 4,936,961; means for the enhancement of the energy output of a fuel gas, U.S. Pat. No. 4,826,581; and an electrical circuit control system for a hydrogen fuel gas generator, U.S. Pat. No. 4,798,661.

In my present application, I describe an integrated fuel gas management system that enables hydrogen to be efficiently, reliably and safely used as a fuel gas in an internal combustion engine having a configuration derived from conventional engines fueled by a fossil fuel, such as gasoline, diesel or other petroleum or hydrocarbon derivative.

In the prior art, significant effort directed towards the utilization of hydrogen as a vehicle fuel has attempted to devise a hydrogen powered internal combustion engine that emulates the characteristics of a conventional hydrocarbon fueled (gasoline, diesel, propane, methanol, etc.) engine system. While such an extension of an existing technology to a hydrogen fuel appears logically proper, such prior art techniques have not fully considered: (1) that the volatility, or "burn rate", of hydrogen is many times greater than that of a fossil fuel, and (2) that the combustion "window" for hydrogen in an oxygen containing atmosphere is exceedingly narrow, and is considerably narrower than that of a fossil fuel. A fuel such as gasoline or diesel oil will satisfactorily perform and support combustion over a wide range of fuel mixtures having different proportional quantities of oxygen. Hydrocarbon fuels typically support engine speeds over a wide range in an internal combustion engine because of its broad combustion envelope; hydrogen in contrast, will combust satisfactorily only when a hydrogen/oxygen mixture in the ratio of 2:1 is present. This factor makes combustion cycle development for hydrogen fuel a critical art in which the hydrogen burn rate (equated to power output of the engine) and the combustion mixture containing the hydrogen fuel must be carefully regulated over the entire RPM operating range of an engine so that combustion is efficiently supported over the range.

The invention herein provides a gas fuel for an internal combustion engine comprising a mixture of gases including hydrogen, oxygen, and other gases that are not combustible with hydrogen in which the mixture includes a proportion of hydrogen to oxygen of approximately 2:1 and a predetermined density of hydrogen within the mixture gases such that the burn rate of the mixture approximates that of a fossil fuel.

There is further management system provided for a fuel gas mixture containing hydrogen that is introduced as a fuel to an internal combustion engine that consists of means and process for monitoring the composition of a fuel gas mixture introduced into the engine such that the proportion of hydrogen to oxygen in the mixture is approximately 2:1; and means and process for modulating the density of the hydrogen component of the introduced fuel gas mixture by the addition of other noncombustible gases to the mixture such that the burn rate of the fuel gas mixture approximates that of a fossil fuel.

In the management system, apparatus for the distribution of the fuel gas mixture containing a hydrogen gas component is utilized which is formed from a plurality of conduits having an internal diameter of 0.015 to 0.025 inch intrinsically formed in an otherwise solid member.

In addition, the system includes a means and process for the mixing of a proportion of the exhaust gas of the engine into the fuel gas mixture introduced into the engine to provide modulation for the hydrogen in the fuel mixture. Thus, in a further aspect the invention is an improvement to a hydrogen fueled internal combustion engine that includes means and process for modulating the density of the hydrogen component of a fuel gas mixture introduced into the engine such that the burn rate of the fuel gas mixture containing hydrogen is reduced to the approximate burn rate of a fossil fuel. This means and process includes mixing a hydrogen containing fuel gas with at least one of ambient air and exhaust gas from the engine. These features of the invention are explained herein with reference to the figures.

Figure 1:
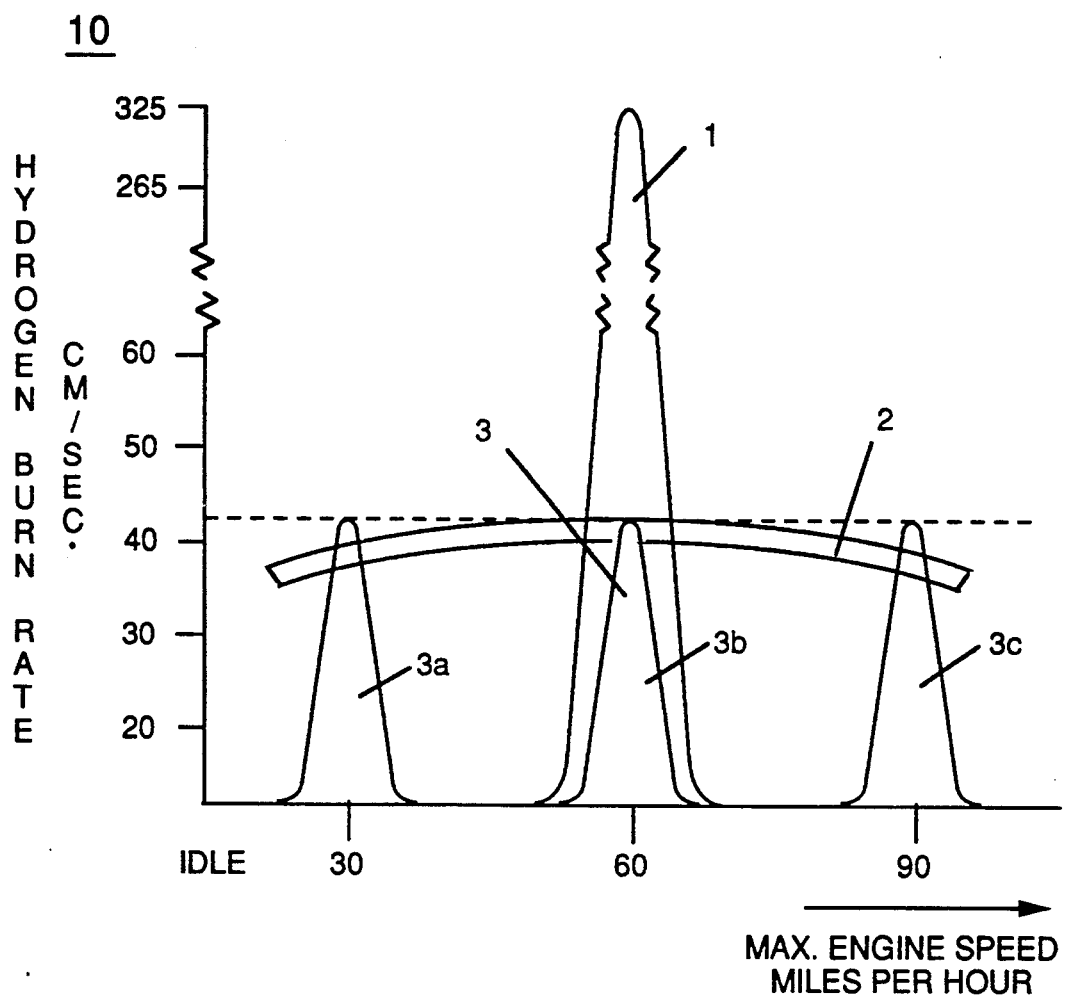

With reference to FIG. 1, it is an object of the invention to regulate a hydrogen fuel gas mixture that is introduced into the engine combustion chamber such that the burn rate of the hydrogen fuel gas remains constant regardless of engine RPM. As used herein, "burn rate" is an arbitrary measure of the relative volatility of a fuel gas (in contrast with the rate at which a given fuel is consumed, e.a., miles per gallon). Thus, it is an object to regulate the combustion "window" of hydrogen in a gas mixture so that optimum combustion is achieved, regardless of engine speed.

With reference to Table I, the extreme volatility of hydrogen in the atmosphere (burn rate: 325-265 cm/sec) is shown in contrast with the relatively equivalent burn rates of several known hydrocarbon and fossil fuels (burn rates: 45-35 cm/sec):

TABLE I

| Relative Burn Rates of Various Fuels | | |
|---|---|---|
| Fuel | Burn Rate (cm/sec) | Ratio to Gasoline Burn Rate |
| Hydrogen | 325-265 | 8× |
| Methane | 45-37 | 1 (approximate) |
| Alcohol | 44-37 | 1 (approximate) |
| Gasoline | 43-37 | 1 |
| Natural Gas | 42-37 | 1 (approximate) |
| Propane | 41-36 | 1 (approximate) |
| Diesel Fuel | 40-35 | 1 (approximate) |

The combustion characteristics and high volatility of hydrogen can be charted with reference to an axis correlated to the running speed of an internal combustion engine, as illustrated by the narrow combustion envelope for hydrogen, shown in FIG. 1 at 1 in contrast with the combustion envelope, for example, in gasoline, 2.

Typically, in the tuning of an engine for either optimum performance or efficiency, the low volatility and the wide combustion envelope of a fossil fuel permits an engine to be tuned, for example, to an optimum speed corresponding to 60 MPH, without concern for significant adverse effects or need for adjustment over the remaining engine operating range. The narrow combustion envelope of hydrogen, however, prevents such broad tuning and consequently results in fuel overenrichment and the engine operation difficulties noted above, passim.

In the invention, the burn rate of the hydrogen fuel gas is adjusted to be equivalent to that of a fossil fuel by the introduction into the hydrogen fuel of other noncombustible gases that serve as a modulator of the inherent volatility of the hydrogen. In addition, the hydrogen/oxygen ratio of 2:1 which represents the optimum combustion ratio for a hydrogen fuel is uniformly maintained in the modulated fuel mixture over the engine operating range, e.g. at speeds represented by 3a, 3b, 3c. The combustion window of hydrogen at a modulated given volatility remains in the same 2:1 hydrogen-:oxygen ratio. Thus, the modulated burn rate of the hydrogen fuel gas, adjusted downward to 43-37 cm/sec, is maintained uniformly in the range of speeds from idling to maximum RPM, in contrast with conventional engine design based on typical gasoline burn rate, which is not usually adjusted. Nevertheless, because of the wide combustion window for gasoline, optimum tuning at 60 MPH as shown at 2 in FIG. 1 will allow satisfactory engine operation to other speeds. In the prior art, use of unmodulated hydrogen allowed engine operation only in the narrow envelope figuratively shown in curve 1.

In the invention, a processed gas mixture including a hydrogen fuel component-having a uniform, predetermined volatility is generated by the system and introduced into the engine in a proper mixture to insure optimum combustion throughout the range of engine operating speeds.

Figure 2:
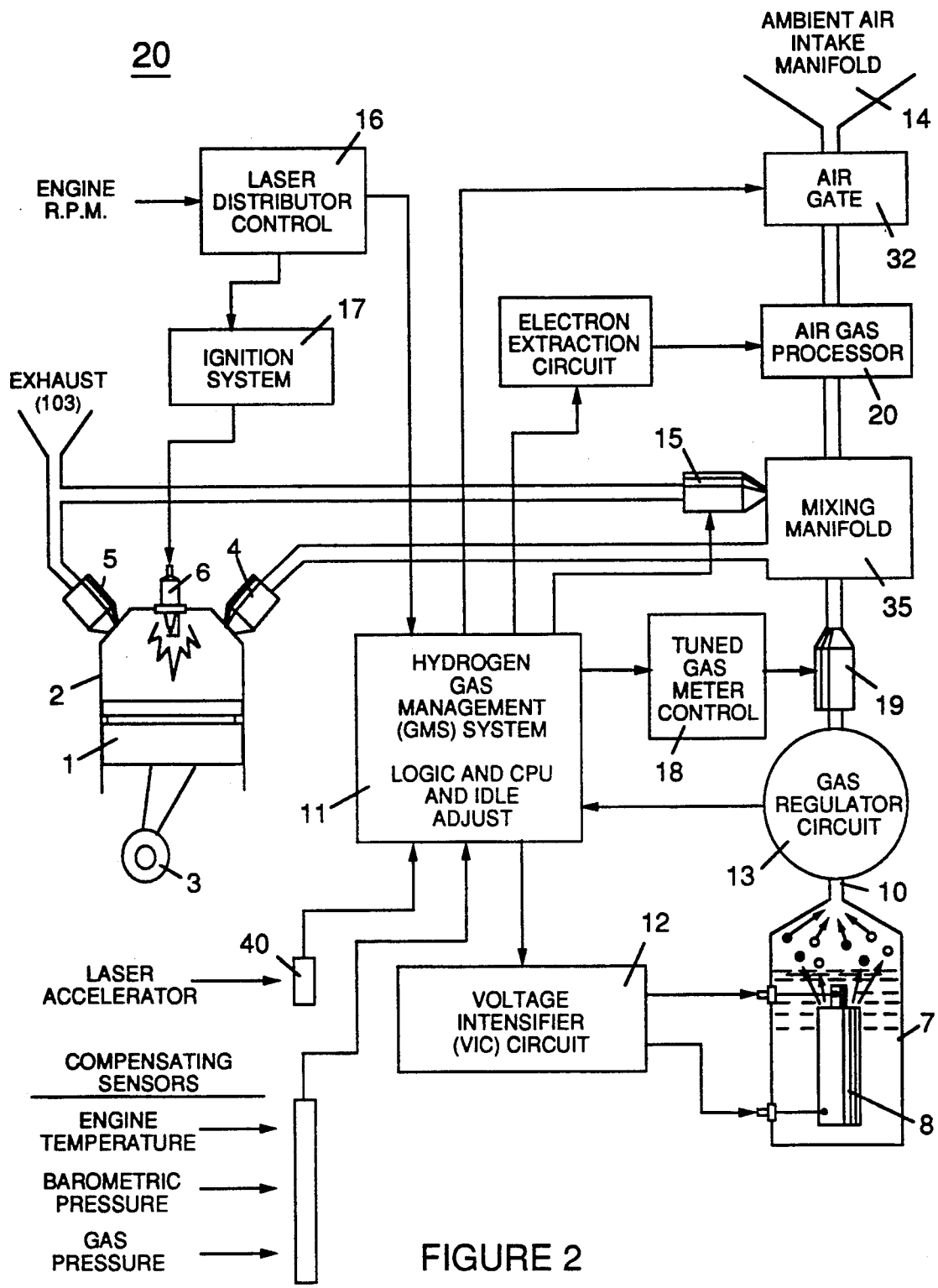
FIG. 2 is a block diagram of a combustion management system for a hydrogen containing fuel gas mixture that is injected into a combustion chamber, showing the interrelationship of system management controls with various engine parameters.

FIG. 2 shows a block diagram of a complete hydrogen gas management system. For explanation and illustration purposes, one cylinder of an engine is shown, however, it is appreciated that adaptations of the system to multiple cylinder engines are within the skill of the art.

In the system diagram of FIG. 2, there is shown a conventional reciprocating piston internal combustion engine configuration including piston 1 and cylinder 2 connected to a rod and crankshaft mechanism 3, fuel intake valve 4, exhaust valve 5, and spark plug 6. Valves 4 and 5 and spark plug 6 are operatively interconnected to the management system of the invention.

One aspect of an overall system provides a source of fuel gas including hydrogen, such as a water fuel cell, 7, described in my U.S. Pat. No. 4,936,961 including water capacitor 8 immersed in a volume of water 9 which produces a source of a hydrogen/oxygen and non-combustible gas mixture 10 that is operatively interconnected with the gas management system 11 through regulator 13. Preferably the gas management system 11 includes a logic module and central processing unit interconnected to sensors and controllers in the system. The voltage intensifier-circuit 12 regulates voltage amplitude, pulse frequency and gated pulse frequency associated with operation of the fuel cell 7. (See U.S. Pat. No. 4,936,961, FIG. 1, and U.S. Pat. No. 4,798,661.) and is operatively interconnected to the gas management module.

The gas pressure regulator 13 is included proximate the exit orifice of the cell to maintain a consistent back pressure (optimally 15 psi in the preferred embodiment) in the fuel delivery system.

The gas management system logic module 11 determines the mixing of the hydrogen fuel gas mixture 10 produced by the cell with other modulating gases such as ambient air, introduced through manifold 14 and/or exhaust gas introduced through gate 15. The management system module includes inputs from sensors relating to air and engine temperature, engine RPM, gas pressure and the vehicle accelerator or engine speed control 40 which determines the speed at which the engine operates.

A distributor control 16, as in a conventional internal combustion engine, determines ignition system function 17 and additionally provides an input signal for a tuned gas meter control 18 that is operatively interconnected to the injector port 19 so that a uniform quantity of modulated fuel gas is injected through valve 4 into the cylinder upon each operating cycle of the cylinder. Air gas processor 20 is also included for treatment of gas derived from ambient air introduced in the system through the intake manifold. (See FIGS. 3, 4, 4A, 4B and discussion, infra.)

Figure 3:
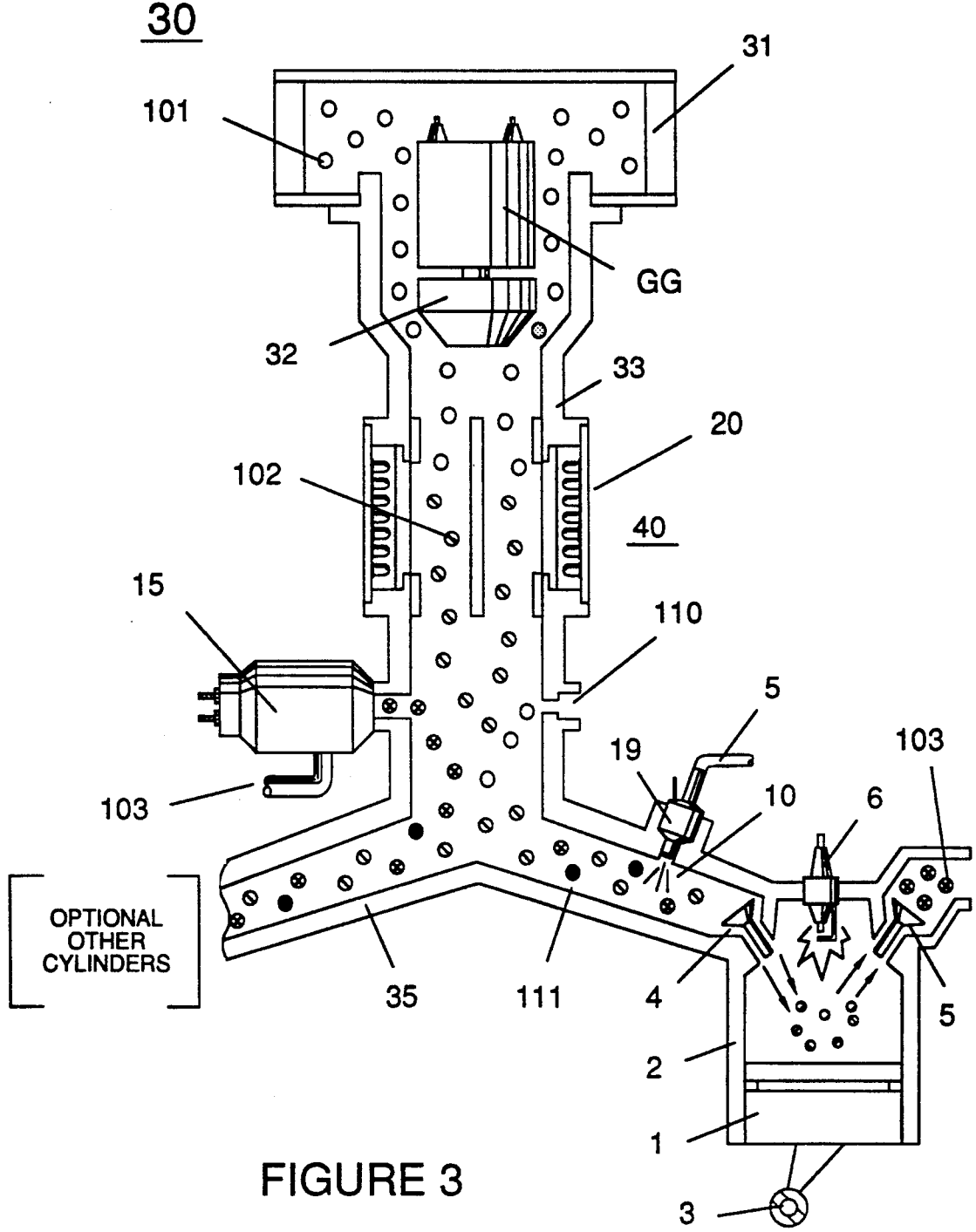
FIG. 3 illustrates the physical arrangement of a hydrogen fuel gas control means and injection system for the regulation of fuel gas transmitted to an engine combustion chamber.

FIG. 3 illustrates an appropriate mechanical configuration adapted to the overall system shown in FIG. 2. An intake manifold (not shown) directs ambient air 101 to air filter assembly 31 operatively interconnected to an inlet valve 32 which is regulated by the management module and controls the flow of air into air processor 33 which produces a source of ionized non-combustible gases 102, that in turn may be mixed with non-combustible cylinder/engine exhaust gases 103 introduced at exhaust gate 15. These gases are mixed in the intake manifold 35 with gas from the fuel cell 7, introduced at injector port 19 whereupon the modulated combustion mixture having the hydrogen fuel component in the correct proportion with oxygen is delivered to the cylinder at a burn rate equivalent to that of a fossil or hydrocarbon fuel. An oil inlet port 110 for lubrication is optional. Thus, in the air processor ambient air 101 is ionized and the ionized gas 102, and other modulating gas such as the exhaust gas 103 is mixed until the fuel gas 10 for introduction to the cylinder at the modulated burn rate. Lubricating oil mist is shown at 111.

Appropriate sensors for monitoring air pressure, RPM and engine temperature are operatively interconnected with the management module and controllers regulate various fuel source or fuel gas mixture parameters such as the proportional air mixture introduced in the fuel gas or the proportional exhaust mixture introduced in the fuel gas at respective gates. Idling, low temperature operation adjustments or other calibration adjustments for normal ambient conditions are made by trim pots on other means included in the management module.

Figure 4:
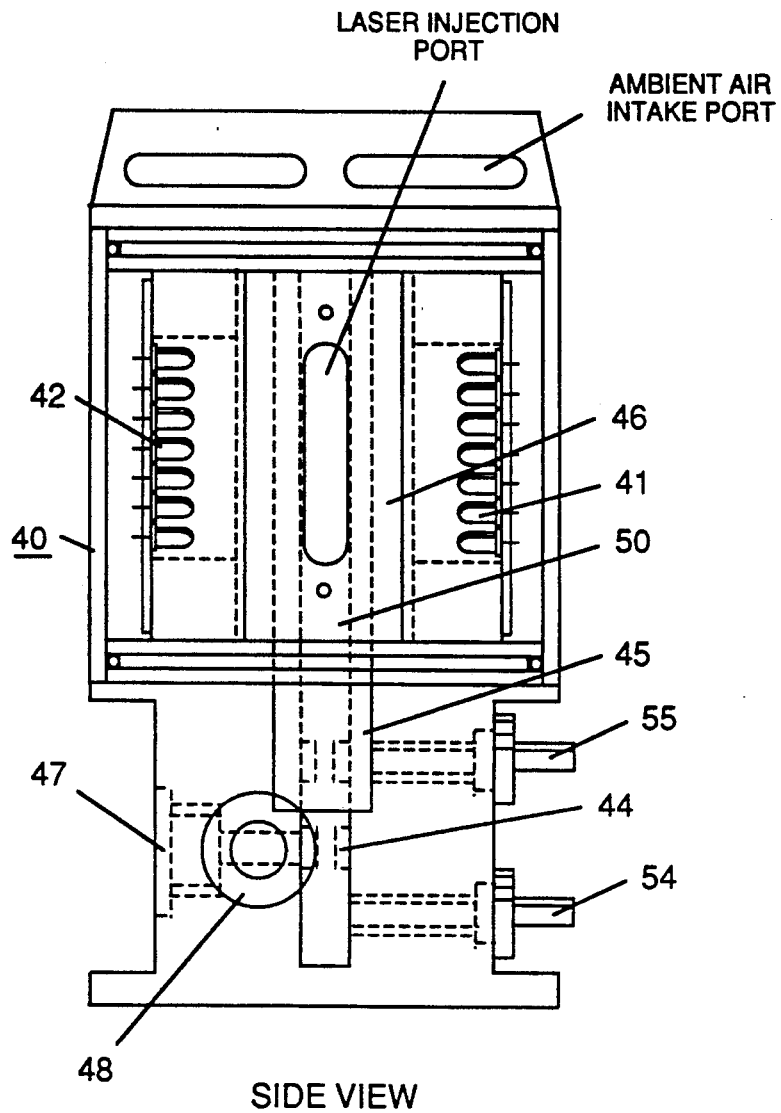
FIG. 4 shows an air gas processor useful in the system of the invention in a cross-sectional side view.
Figure 4A:
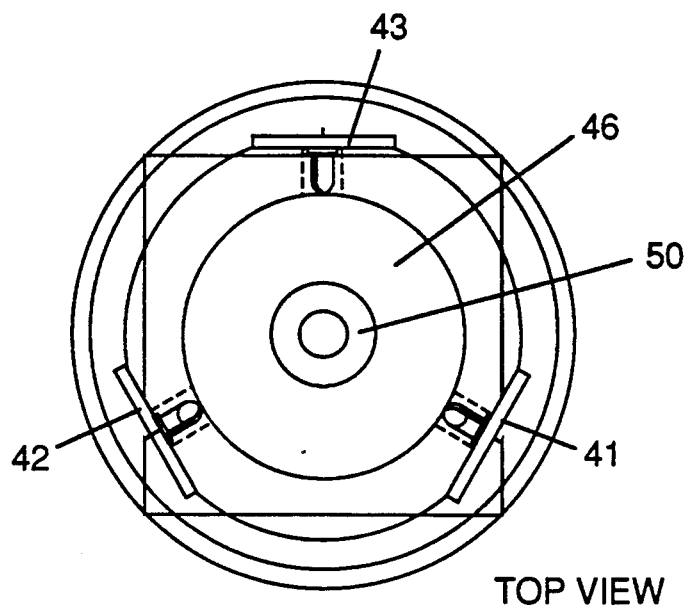
FIG. 4A shows a top plan view.
Figure 4B:
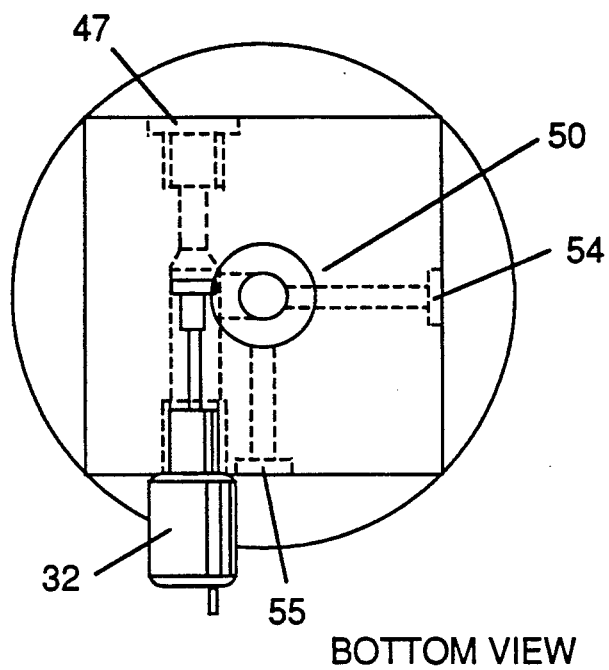
FIG. 4B is a bottom view.

In a preferred mode, air gas processor shown at 20 in FIG. 2 and in greater detail in FIGS. 4, 4A and 4B is operatively interconnected with a hydrogen fuel cell gas generator operated in accordance with the method of my U.S. Pat. No. 4,936,961. Shape and size of the resonant cavity such as described in my U.S. Pat. No. 4,936,961 may vary. Larger resonant cavities and higher rates of consumption of water in the conversion process require higher frequencies such as up to 50 KHz and above. The pulsing rate, to sustain such high rates of conversion must be correspondingly increased. As noted above in the preferred embodiment of FIG. 2, the pulse generating circuit of the method is interconnected with the management module such that fuel gas is generated by the fuel cell gas generator on demand and such that the fuel cell operation is also responsive to sensed parameters and control signals generated. Other sources of a hydrogen fuel gas may be used, as well as other types of fuel; the system of the invention manages the combustion characteristics of the engine fuel and the-delivery regardless of source.

FIG. 4, 4A and 4B show a side frontal cross-section and plan view from the top and bottom of a type of air gas processor such as 20 shown in FIG. 2. In essence, the processor 40 of FIG. 4 and its operation essentially correspond to the method and apparatus shown and described in my U.S. Pat. No. 4,826,581, (incorporated herein by reference), however, as used in the system of the present invention, the ambient air gases (not the combustible gas produced by the fuel cell), on a reduced scale, are charged and ionized and otherwise enhanced in energy before the ambient air gases are mixed with the fuel gas.

In the processor 40 shown in FIGS. 4, 4A and 4B a treatment chamber 50 is provided that encloses a set of batteries 41, 42, 43 of solid state lasers, e.g. 42, a, b, c, d, etc., that are concentrically mounted around a charging cell formed from positively and negatively charged concentric rod 44 and cylinder rod 45 which are connected to an ionizing voltage source through terminals 54 and 55. Optical lens 46 concentrates the laser output to the gas flowing through the processor which also includes outlet port 47 for the energized air gas and a gas meter control 48. The electron extraction circuit 7 ionizes the incoming ambient air gases and consumes the electrons ejected from the gas atoms while the injected laser energy energizes the ionized gases to prevent-the processed ambient air gases from reverting back to stable-state, as illustrated by FIG. 7.

In the preferred embodiment of the invention a hydrogen fuel gas mixture is generated by the method of my aforesaid U.S. Pat. No. 4,936,961. That gas comprises a mixture of hydrogen, oxygen and other formerly-entrapped gases dissolved in water. It is the purpose of this invention, beginning with the hydrogen component of a fuel gas, to adapt hydrogen gas to the approximate burn rate of a fossil fuel for use in an internal combustion engine and to maintain the ratio of hydrogen to oxygen in the mixture at the most efficient 2:1 ratio. The system of the invention modulates the hydrogen component of the overall gas mixture such that the burn rate of the hydrogen-containing fuel mixture approximates that of a fossil fuel as illustrated in FIG. 1.

While the invention of my U.S. Pat. No. 4,936,961 produces a gas mixture including hydrogen, oxygen and all other gases that were formerly dissolved and entrapped in the water from which the hydrogen/oxygen gas mixture released by the process was formed, further modulation of the burn rate of this hydrogen fuel gas mixture occurs in the system of the present invention as a result of mixing with processed ambient air and the water vapor produced as a combustion exhaust product of the engine. In this regard, the rate of gas production in a water fuel cell (or the introduction of hydrogen per se into the system if a water fuel cell is not used as a fuel source) determines the amount, per se, of hydrogen introduced into the system, but in the manner in which the hydrogen fuel is modulated, mixed with oxygen, and injected in optimal quantities and mixtures into the engine cylinder.

The regulation of the burn rate of the hydrogen fuel, which is of crucial importance in a hydrogen fueled internal combustion engine according to the system of the invention, is determined by the relative proportion of the mixture of the hydrogen containing fuel gas with ambient air or exhaust gas including water vapor that is recycled into the engine. The fuel gas mixture produced by the fuel cell intrinsically includes the optimum 2:1 ratio of hydrogen to oxygen. The mixture of hydrogen and non-combustible gas that modulates the burn rate of the hydrogen fuel mixture to that equivalent to gasoline must be achieved by the addition of the non-combustible gases and maintained uniformly over the range of engine operating speeds. This is accomplished by correlating the rate of fuel gas production from the water fuel cell with the introduction to the gas mixture of other non-combustible gases. This can be accomplished in a simplified engine by manual control involving manually sensed "look, touch and hear" impressions, as well as by complex electronic control means for more sophisticated engines. Maintenance of the Consistency of the mixture by the management module prevents overloading of the engine with hydrogen and permits smooth running of the engine regardless of engine RPM or power load. The distributor and ignition system operates in a conventional mode to provide spark ignition of the fuel and oxidant mixture in the cylinder at the appropriate time in a piston reciprocating cycle that is otherwise also related to fuel intake and exhaust outlet sequences in the cycle. In the invention, however, two aspects of the injection of the fuel gas mixture into the cylinder at the intake cycle are controlled: (1) the 2:1 proportion of hydrogen to oxygen to "non-combustible" gases in the fuel intake mixture is maintained at a predetermined proportion such that the "burn rate" is maintained at the lowered predetermined rate corresponding to that of a fossil fuel; and (2) the quantity of the fuel mixture introduced to the cylinder at the intake of the cycle is the same per cycle regardless of engine RPM. Thus, although the rate of hydrogen production by the fuel cell must increase with higher engine RPM, the consumption of hydrogen, per cycle, remains constant. This constancy is maintained by the tuned gas meter control 18, 19 and by variation of the rate of gas production in the fuel cell as controlled by the gas management system CPU, 11. The gas meter control which provides the uniform delivery of the fuel gas mixture is determined by pulse signals generated by the distribution corresponding to each cycle of the engine.

FIG. 6 represents the modulating effect on hydrogen density in a gas mixture, that the other large (non-combustible) gas molecules have in the hydrogen fuel gas that is accomplished by the invention. To wit, other gases dilute the hydrogen concentration in a given volume; the dilution in turn reduces the burn rate of the hydrogen per se component and enables the burn rate of the overall fuel gas mixture produced by system to approximate that of a fossil hydrocarbon fuel. As this modulation of the burn rate occurs, however, it is necessary to maintain the overall ratio of hydrogen to oxygen in the mixture as close to 2:1 as possible to prevent overenrichment of the hydrogen in the fuel and the consequent shut down problems that result from an excess of hydrogen. Thus, inert water vapor exhaust gas, (e.g., from valve 5 in FIG. 2), as well as ambient air, is used as a dilutent. The introduction of ambient air may result in a proportional excess of oxygen in the mixture over the preferred ratio; however, excess oxygen insures complete combustion of the hydrogen component; to the extent that oxygen is in excess, it is a non-combustible dilutent. Too much of an oxygen excess may result in the production of undesirable $NO_x$ exhaust gases; however, this is not a significant problem and may be resolved in the engine system of FIG. 2 by the introduction of more exhaust gas rather than air as a dilutent. When the burn rate of hydrogen is, however, reduced to that of a fossil fuel, the production of nitrogen oxides is reduced because the combustion temperature and rate is reduced.

Sensors of the system of FIG. 2 monitor air pressure and temperature which affect the dilution of the hydrogen fuel. The management module CPU and controllers appropriately adjust the gas mixture components to maintain a uniform burn rate for the fuel mixture regardless of engine speed. For example, if the burn rate is not maintained at a constant, the introduction of additional hydrogen by throttling the engine would disrupt the narrow combustion window of the gas resulting in engine inefficiency, roughness or shut down because of the overenrichment.

Figure 5:
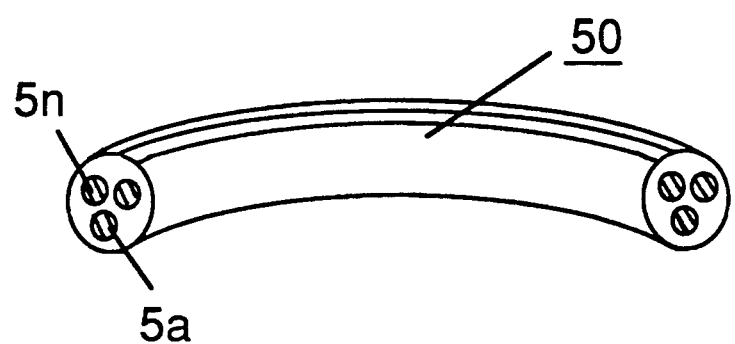
FIG. 5 shows a "quenching conduit" for the safe distribution of a hydrogen fuel in the engine environment.
Figure 5A:
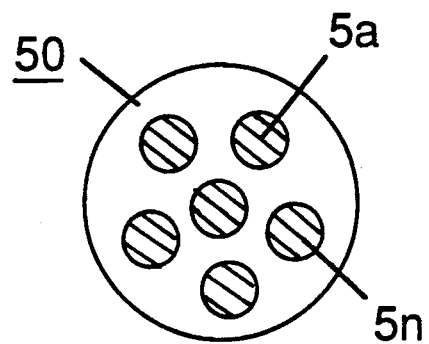
FIGS. 5A and 5B shows alternative cross section configurations for said conduit.
Figure 5B:
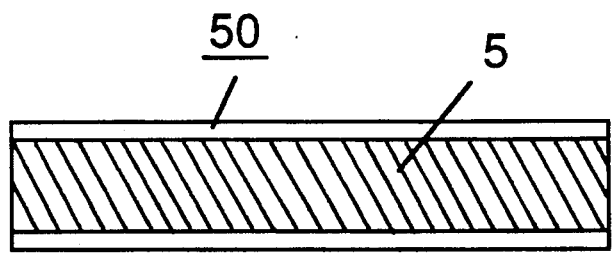

Distribution of the hydrogen gas (or the fuel gas mixture produced by the means of my aforesaid Letters Patent) within the engine system may be accomplished by an appropriately configured circuit of "quenching tubes", such as are shown in FIGS. 5 and 5B. The quenching tubes comprise a conduit of discrete small volumes such as formed in an open cell porous material formed in an otherwise solid, extending member. Typically, a plurality of conduits of microcell type material from 0.015 to 0.025 inch in diameter may be formed in a solid length having an outer diameter of approximately 0.378 inch in the manner shown in FIG. 5. The conduit size specified is appropriate for a fuel gas having a burn rate equivalent to gasoline. Conduit diameters may be proportionately larger or smaller if the hydrogen concentration is further diluted or increased. The quenching tube prevents burn-back or flash-back of hydrogen in its delivery tube. Flash-back, a serious problem in conventional hydrogen gas transport systems, is eliminated by the quenching circuit tubes of the invention.

In the control system of the invention, all parameters are adjusted to maintain a uniform burn rate of the hydrogen containing fuel gas, which is the key to smooth engine operation. In the mechanical system shown in FIG. 3, the characteristics of the hydrogen fuel are modified to adapt to load conditions, and the system works in a manner comparable to that of a conventional carburetor in a fossil fueled engine.

When used with a water fuel cell and the method of my aforesaid U.S. Pat. No. 4,936,961, a preferred management system includes a pulse generator for fuel gas production and includes a phase lock loop circuit that detects and scans a resonant frequency in the fuel cell generator and maintains that frequency.

From the foregoing description of the preferred embodiment, other variations and modifications of the system disclosed will be evident to those of skill in the art.

What is claimed is:

1. A management system for a fuel gas mixture containing hydrogen that is introduced as a fuel to an internal combustion engine consisting of:
   means for monitoring the composition of a fuel gas mixture introduced into the engine such that the proportion of hydrogen to oxygen in the mixture is approximately 2:1; and
   means for modulating the density of the hydrogen component of the introduced fuel gas mixture by the addition of other non-combustible gases to the mixture such that the burn rate of the fuel gas mixture approximates that of a fossil fuel.

2. The system of claim 1 in which the means for modulating includes a means for the mixing of a proportion of the exhaust gas of the engine into the fuel gas mixture introduced into the engine.

3. Apparatus for the distribution of a fuel gas mixture containing a hydrogen gas component comprising a plurality of longitudinally extending conduits having an internal diameter of 0.015 to 0.025 inch intrinsically formed in an otherwise solid matter.

4. The apparatus of claim 3 in which the conduit comprises a porous open celled foam.

5. A process for maintaining combustion in an internal combustion engine that is fueled by a fuel gas mixture containing hydrogen that is introduced as a fuel to consisting of:
   monitoring the composition of a fuel gas mixture introduced into the engine such that the proportion of hydrogen to oxygen in the mixture is approximately 2:1;
   modulating the density of the hydrogen component of the introduced fuel gas mixture by adding other non-combustible gases to the mixture such that the burn rate of the fuel gas mixture introduced to the engine approximates the burn rate of a fossil fuel; and
   maintaining the volume of the introduced fuel gas mixture at a predetermined quantity for each operating cycle of the engine, regardless of engine operating speed.

6. The process of claim 5 in which the step of modulating includes mixing a proportion of the exhaust gas of the internal combustion engine into the fuel gas mixture introduced into the engine.

7. The process of claim 5 including the step of ionizing ambient air gases and introducing said ionized gases to the fuel gas mixture.

* * * * *